Patented Nov. 9, 1937

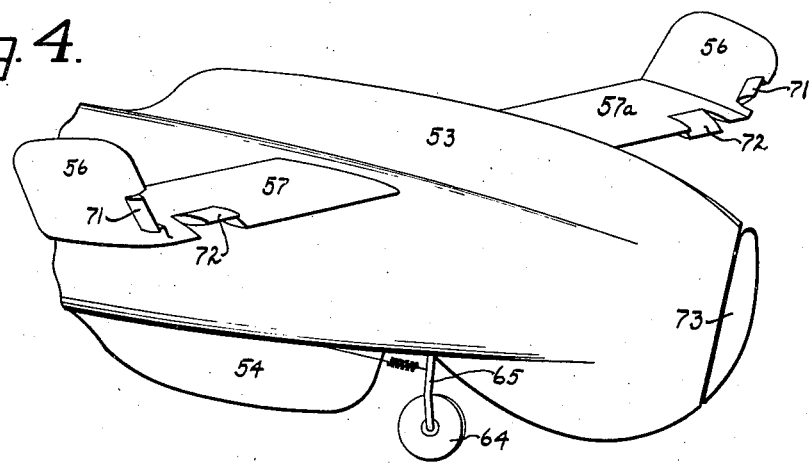
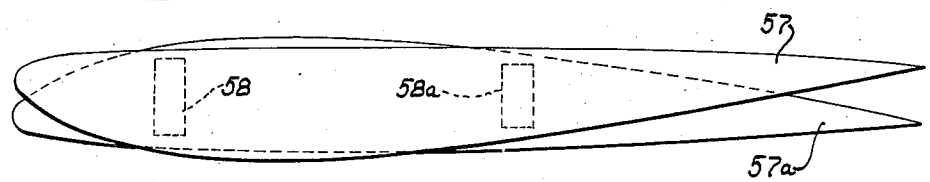
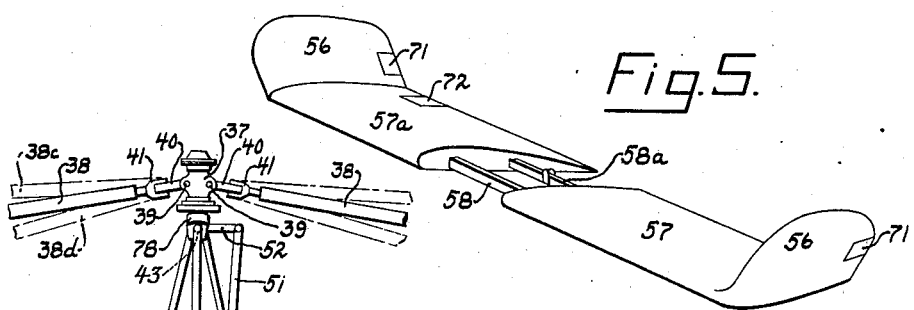
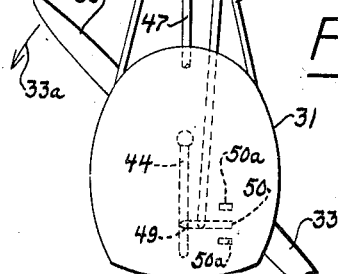

2,098,230

UNITED STATES PATENT OFFICE 2,098,230

AIRCRAFT WITH FREELY ROTATIVE WINGS

Juan de la Cierva, Madrid, Spain, assignor to Autogiro Company of America, Philadelphia, Pa., a corporation of Delaware Application March 6, 1934, Serial No. 714,242. Renewed October 23, 1936. In Great Britain March 13, 1933

26 Claims. (Cl. 244—19)

The present invention relates to aircraft of the type having a power unit comprising an engine and airscrew, for forward propulsion, and whose principal means of support in flight consists of one or more autorotative rotors, each comprising a plurality of blades or wings mounted for free rotation about a substantially vertical axis and being positioned and adapted to be driven in flight by the action of the flight wind; although for purposes of starting the rotor before flight (and perhaps also, in some machines, for assisting its rotation in flight in certain special circumstances) a driving connection between the engine and the rotor may be established.

In aircraft of the type referred to, it is in general necessary to provide means for suppressing or compensating the unbalanced rolling moments which may be generated by the action of the flight wind on the rotor on account of the difference between the true air speeds of the advancing and retreating blades. Such means may be included, for example, within the rotor itself; that is, the rotor structure itself may incorporate means for substantially equalizing the lift forces of the advancing and retreating blades; as, for instance, by pivoting or hinging the blades or wings to the rotor hub member for variation in their aerodynamic angle of attack, the blades preferably being so pivoted (or otherwise flexibly arranged) as to have independent swinging movements in substantially vertical planes. Alternatively, or in addition to the hinging of the blades, means may be provided for automatically impressing a periodical variation on the pitch angles of the blades.

The present invention relates to rotating wing aircraft, particularly of the above-mentioned type in which the major rolling moments are suppressed or compensated in any manner as above described, and the present invention is especially useful in such aircraft in which, further, the lateral control, that is the control in roll, and in certain cases the control in yaw also, is effected by operating on the rotor itself, as by causing a shift of the lift line thereof. This may be accomplished by sideways tilting or parallel bodily displacement of the structural axis of the rotor, as described and claimed in my co-pending application Number 645,985, filed December 6th, 1932, (see my British Patent No. 393,976) or alternatively by operating on an impressed periodic variation of the pitch angles of the rotor blades, by controlling the amplitude and/or the phase of said periodic pitch variations, as described and claimed in my co-pending application Number 698,372, filed November 16th, 1933 (see my British Patent No. 410,522).

The principal object of the present invention is the provision in an aircraft of the kind referred to of improved means for neutralizing the reaction torque of the engine and airscrew. The difficulties encountered, and the advantages of this primary object of the invention, will be clarified by the following:

The problem of correcting the airscrew reaction torque presents no serious difficulty in ordinary fixed wing aeroplanes. On account of the great span of the fixed wings the motion of an aeroplane is heavily damped in roll and in addition the lateral stability is generally such that large restoring forces in roll are produced. For this reason the rolling moments applicable by the ailerons are of a fairly large order when compared with the torque reaction so that no special means of correcting the latter are in general required. On the other hand, in rotary-winged aircraft in which the lateral control is effected by operating on the rotor itself, the damping in roll is of a very small order, more especially when the rotor is of the kind having hinged blades as aforesaid. At the same time, although such an aircraft may be made laterally stable, as for instance by means of the stabilizing devices described in my aforementioned application No. 645,985, the degree of stability is in general such that the restoring forces are of a small order.

The problem of torque reaction correction therefore assumes great importance. In fact, it has been found (in machines employing tilting of the rotor for control purposes) that a greater amplitude of lateral control movement of the rotor is required to compensate the torque reaction in all conditions of flight from engine-off to full throttle than is required for the purpose of lateral control. Further, if the torque reaction is compensated by displacement of the rotor, or by an equivalent (such as modification of the periodic pitch variations of the blades thereof) a continual adjustment is necessary during flight, since, while at a constant throttle setting the reaction torque is substantially invariable, the couple opposing it is the resultant of aerodynamic forces (for which the rotor is principally responsible), inertia forces and gravity; the aerodynamic forces being subject to fluctuations on account of wind gusts and changes of attitude of the aircraft while the inertia forces vary with the accelerations to which the aircraft is subjected. The couple opposing the airscrew reaction torque thus depends on the momentary values of the aerodynamic forces and of the accelerations.

According to the present invention, in a rotative-winged aircraft of the type herein referred to, wherein the lateral control, i. e., control in roll, is effected by operating on the rotor either by tilting it bodily or by controlling the pitch angles of the rotor blades to produce a lateral tilting of the path swept by the tips of the rotor blades, aerodynamic means such as one or more fixed aerofoil surfaces are provided, situated within the slipstream of the airscrew or airscrews, and so disposed angularly to said slipstream or streams that the effective angle of incidence to the slipstream of the whole or part of such surface on one side of (or above) the longitudinal axis of symmetry of the aircraft differs from that on the other side of (or below) said axis of symmetry, so that an aerodynamic couple is produced neutralizing the airscrew reaction torque. Stated in another way, one or more such surfaces is placed at such an angle to the longitudinal axis of the slipstream as to produce a couple substantially neutralizing the airscrew reaction torque on the aircraft.

The compensating couple produced in this manner is substantially self-regulating, in that it varies substantially in accordance with the reaction torque. The velocity of the slipstream, and hence the compensating couple, is largely independent of the speed of flight. As the speed of flight is increased the velocity of the slipstream does in fact increase slightly but I have found that the effect of this is more or less balanced automatically by a simultaneous reduction in the angle of "swirl" or twist of the slipstream. Variation of the reaction torque by altering the throttle setting of the engine is automatically compensated by a corresponding variation in the slipstream velocity.

The present invention may be carried into practice in a single engined or tandem engined aircraft preferably by providing a pair of fixed fins or surfaces disposed symmetrically with respect to the axis of the slipstream and set with a differential angle of incidence with respect to one another, the difference in the angle of incidence of the respective surfaces being arranged with respect to the direction of rotation of the slipstream so as to produce a couple opposing the reaction torque.

It will in some cases be sufficient to employ surfaces with a fixed differential angle of incidence but in order to obtain greater accuracy in correcting the reaction torque in all conditions of flight the differential angle of incidence may be made adjustable under the control of the pilot either by movably mounting one or both of the surfaces as a whole or by the provision of movable trailing flaps.

The fins or surfaces for correcting the reaction torque may be arranged either vertically or horizontally or in any other suitable way, and in order to simplify the construction of the aircraft and to effect the greatest possible economy in weight and parasite drag the fixed fins or surfaces for correcting the reaction torque may be combined or made identical with fins or surfaces provided for other purposes. For instance, they may consist of a pair of small horizontal fixed wings near the front of the aircraft which are incorporated in the structural arrangements of the aircraft either as part of a wheel under-carriage or for supporting lateral floats or the like. Alternatively they may consist of more or less vertical surfaces forming fairings around members of the under-carriage below the body and/or around a member or members constituting the rotor supporting structure above the body. Again, vertical tail fins disposed above and below the body may be given a differential incidence setting for the purposes of the present invention.

Preferably, however, the fixed surfaces for correcting the reaction torque according to the present invention are combined with horizontal surfaces forming a stabilizing tail. The differential incidence setting may be achieved in any convenient way. It is only requisite that the "no-lift lines" of the aerofoil sections of the two members constituting a pair of surfaces as provided for the purpose of the present invention, should be arranged at angles of incidence differing by an amount sufficient to provide the required reaction torque correction. If the two surfaces of any pair have the same aerofoil section throughout with different tion they may be set throughout with different angles of incidence. Alternatively the same result may be achieved by means of "wash-in" and "wash-out". Again the true angles of incidence of the respective members of a pair may be made to differ without relative displacement of the structural elements (such as spars etc.) on which the surfaces are built by using for one of the members of the pair an aerofoil section differing from that of the other member or (if the aerofoil section is unsymmetrical) the same aerofoil section reversed.

For the purpose of the present invention more than one pair of reaction torque correcting surfaces may be employed if desired.

A further object of the present invention comprises the elimination or compensation of effects of yawing produced by the slipstream. This is of particular importance in the case of aircraft of the type referred to and in which the usual controllable rudder for directional steering is dispensed with, the control in yaw being obtained by operating the lateral control of the rotor, through the effect of side slip on a vertical tail fin or fins for initiating a turn when the aircraft is banked. Such a method of directional control has been described in the aforementioned application No. 645,985 and necessitates the employment of a more or less vertical fin surface at the tail of the aircraft.

If a vertical fin surface is placed unsymmetrically with respect to the slipstream, that is with its aerodynamic center of pressure either above or below the axis of the slipstream (more generally above), the "swirl" of the slipstream exerts an unbalanced side force on such a fin which tends to make the aircraft yaw. If this effect is corrected by angularly offsetting the fin a side force tending to yaw the aircraft in the opposite direction is produced when the engine is throttled down. In ordinary aircraft having a rudder or rudders for directional steering this effect would be of minor importance as the yawing tendency in either direction could be easily corrected by means of the rudders but it becomes a unique problem in aircraft in which the rudder is dispensed with as above described.

According to a feature of the present invention therefore, vertical fin surfaces arranged or mounted at the tail of the aircraft for directional stability purposes are arranged to be aerodynamically symmetrical with respect to the slipstream.

It should here be pointed out that I have further found that the true axis of the airscrew slipstream, in this type of aircraft, is in some cases deflected at the rear of the aircraft somewhat below the line of the axis of the airscrew by the action of the down-wash from the rotor, and allowance must be made for this in the disposition of the vertical fin surfaces.

In carrying out this feature of the invention the vertical fin surfaces may be disposed on the vertical centre line of the aircraft and are aerodynamically symmetrical above and below the true average slipstream axis. Alternatively a pair of substantially upright or vertical fin surfaces is disposed laterally, being mounted for instance at or near the ends of a horizontal tail surface, the said vertical fins being disposed within the slipstream but as near its edge as possible. In this position the "swirl" of the slipstream is substantially tangential to the vertical fins and no appreciable yawing effect is experienced even at full throttle.

I have heretofore brought out the fact, (in my above-mentioned application No. 645,985), that in aircraft in which the horizontal and lateral control is effected by operating on the rotor it is important that the whole aircraft should possess positive stability in pitch and yaw; and at least neutral stability in roll, independently of the rotor. It is now further found preferable, more especially when the controllable rudder is dispensed with, that that part of the aircraft which lies within the slipstream should possess positive stability in yaw, since if directional stability is obtained by means of more or less vertical fin surfaces placed outside the slipstream the degree of stability varies considerably according to the throttle opening of the engine and more particularly the forward speed of flight.

As a further means of increasing, simultaneously, the lateral, longitudinal and directional stability, and at the same time economizing in weight and in parasite drag the horizontal tail may, in accordance with this invention, be provided with oblique upturned tips, which contribute not only to the lateral stability but also to the longitudinal and directional stability since they are located at the tail of the aircraft. These upturned tips may lie either within or outside of the slipstream.

It has already been explained that, in aircraft of the kind described wherein the lateral control is effected by operating on the rotor itself, the rolling moments required for lateral control purposes are of a comparatively small order on account of the smallness of the stabilizing restoring moments and the slight damping in roll, and that for this reason a small amplitude only of lateral control movement of the rotor is required, provided the airscrew reaction torque is compensated by fixe surfaces in the slipstream as above described.

It may be stated that as a result of experiments it has been found desirable (for reasons relating both to structure and to operation but which need not here be detailed) to limit the amplitude of rotor tilting movement available for lateral control of the craft to less than six degrees on either side of the neutral position, or an equivalent amount of parallel displacement if the latter method is employed; or, if lateral control is by altering the amplitude of periodic pitch variations, it is desirable to impose on the available range of such amplitude changes a limitation equivalent in effect to the limitation of plus or minus six degrees specified above with reference to tilting the rotor-axis. This desirably limited range of rotor control movements may now be employed, since the present invention avoids the necessity of utilizing a part of the control range for purposes of torque reaction correction.

The nature of the present invention will be more fully understood from the following description of a preferred embodiment thereof, with reference to the accompanying drawings, of which:

Figure 3 is a rear view showing the rotor head and rotor mounting or supporting structure, and the flight controls, of the aircraft;

Figure 4 is a three-quarter rear view, in perspective, of the rear part of the body and empennage of the aircraft;

Figure 5 is a view in perspective showing the tail plane unit removed from the aircraft; and Figure 6 shows diagrammatically the disposition of the aerofoil profiles of the two halves of the tail plane as viewed in side elevation.

Figure 1:
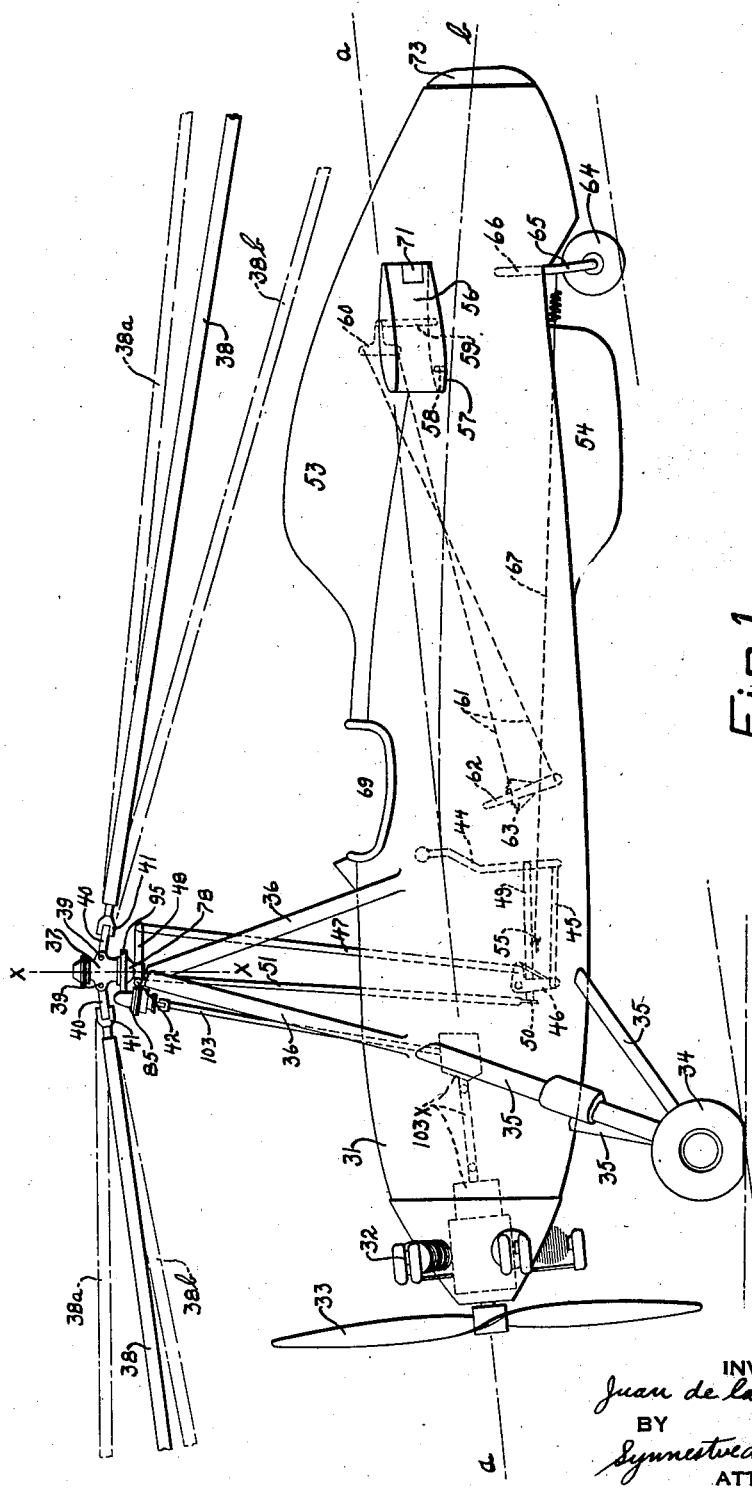
Figures 1 and 2 show an aircraft according to this invention, in side elevation and plan, respectively.

Referring first to the general views of the machine:

The aircraft comprises a body 31, a single engine 32 and a tractor airscrew 33. On the ground it is supported by main wheels 34, which are mounted by means of an undercarriage structure 35, and by a steerable tail wheel 64.

The aircraft is supported in flight by an autorotative rotor consisting of wings or blades 38 flexibly mounted on or articulated to a hub member 37; as, for example, by means of primary pivots lying substantially in a plane perpendicular to the rotor axis such as the horizontal pivots 39, links 40, and secondary pivots lying substantially in planes containing the rotor axis such as the vertical pivots 41; the rotor being mounted at the apex of a pyramid or pylon structure 36.

The hub member 37 rotates upon an axis member 78, which is universally jointed or mounted for tilting both fore and aft and laterally, being mounted on the pyramid structure by means of a transverse pivot 42 and a longitudinal pivot 43 (see Fig. 3). The range of fore-and-aft tilting is indicated in Fig. 1, at 38a, 38b; and the range of lateral tilting is shown at 38c and 38d in Fig. 3. By this, or an equivalent means, the rotary wings may be caused to have their path of travel, or the circle described by the wing tips, varied. Thus, varying of the position of the rotor axis $x$—$x$ causes a shift of its lift line.

Control of the rotor tilting is obtained by means of levers 48, 52, which act directly upon the axis member 78, and are connected by actuating rods 47, 51 with the control mechanism in the pilot's cockpit 69, consisting of a control column 44, rocking shaft 49, link 45 and bell cranks 46 and 50. Lateral tiltability is preferably limited to a range of 6° on each side of the mid-position, as by stops 50a cooperating with an extension of lever 50.

A driving connection between the engine 32 and the rotor hub 37 is provided for rotor starting purposes and comprises shafts and gearing indicated in outline at 103x, an upward extending shaft 103 and driven members generally indicated at 85 including a pinion (not shown) meshing with a crown wheel 95 mounted on the rotor hub 37.

The pilot's control also includes a member 55 similar to a rudder bar, with pedals 55x, which is connected by means of cables 67 to the steerable tail wheel assembly which includes a fork 65 and a spindle 66.

At the rear end of the aircraft body 31 is mounted an empennage consisting of a horizontal tail plane comprising left and right halves 57, 57a, a central fixed fin 53 in the form of a vertical tail fin at the end of the body with an extension running along the top of the body, together with an independent lower fin 54 underneath the body. It will be noted that (in accordance with one of the features of the invention as heretofore discussed) more than half of the total vertical fin area of the tail is located below the axis line a—a of the propeller. Since the longitudinal axis of symmetry a—b of the slipstream is deflected downwardly at the rear by the downwash of the rotor, this disposition of the vertical fin area results in a substantially symmetrical aerodynamic arrangement relative to the slipstream, which is desirable for the reasons hereinbefore set forth.

No steerable rudder, as fitted on an ordinary aircraft, is provided; and it may be noted that the rudder bar 55 has no function in flight, since it only operates on the tail wheel 64, although it may also be arranged to exert a differential application of the wheel brakes on the main wheels 34, if such mechanism is applied.

Figure 2:
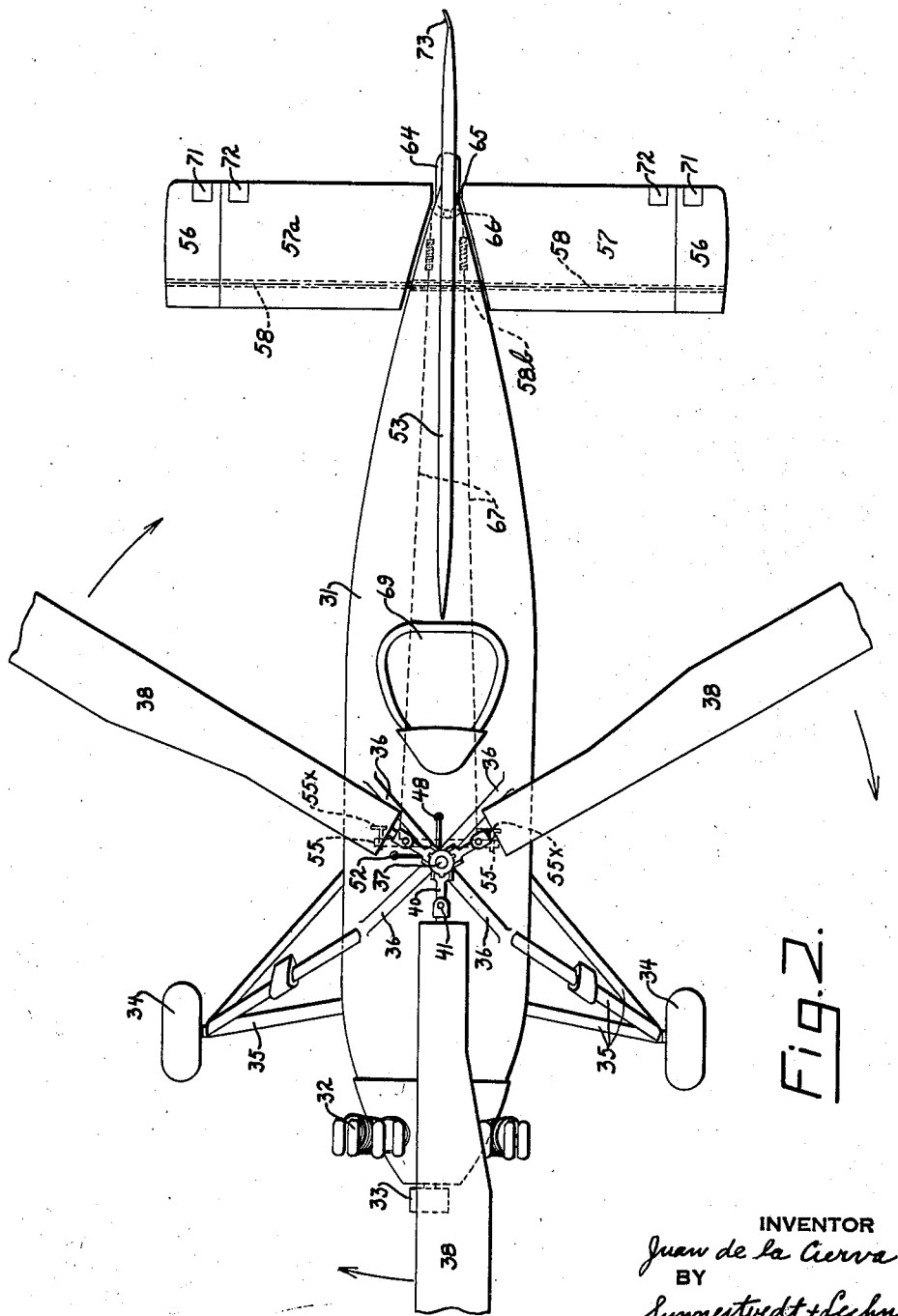

Referring to Figure 5, the two halves of the tail plane are assembled on spars 58, 58a which are continuous across the central gap which is filled by the aircraft body when the tail plane is assembled in place. The spars 58, 58a are mounted in the body 31 in such a manner that the tail plane assembly is rockable with or about the front spar 58, a bearing 58b, for the spar, being shown in Figure 2; the rear spar 58a being capable of being raised or lowered by the link 59, bell crank 60 and cables 61 which are preferably mounted within the vertical fin 53 (as seen in Fig. 1) and connected with a trimming lever 62 in the pilot's cockpit, a ratchet quadrant 63 being provided for adjustably locating the lever 62.

In accordance with the present invention as hereinbefore set forth, the two halves of the tail plane are given different effective angles of incidence and in the example illustrated the same aerofoil section is used for both halves of the tail plane, the right-hand half 57a having the aerofoil section mounted in the normal position, that is with the cambered surface uppermost; while the left-hand half 57 of the tail plane, although having the same spar centres, has its aerofoil section reversed, that is with the cambered surface downwards. The effect of the slipstream from the propeller 33 on the two halves 57, 57a of the tail plane as above described is to introduce a couple tending to roll the aircraft in a counter-clockwise direction as viewed from behind. This couple opposes the airscrew reaction torque which is clockwise or right-handed (as viewed from behind), since the airscrew 33 is left-handed (see arrow 33a in Fig. 3).

The tail plane 57, 57a is further provided with upturned tips 56, preferably extending outside of the slipstream, which exert a stabilizing effect in roll and yaw, on account of their inclination, as well as having a stabilizing effect in pitch. As the greater part of the tail plane 57, 57a lies within the slipstream, the airscrew reaction torque is automatically compensated substantially correctly at all air speeds and throttle openings, since the rolling couple of the tail plane depends on the speed of the slipstream, which in turn depends principally on the throttle opening and hence increases and decreases with the reaction torque.

The upturned tips 56 of the tail plane are provided with small trailing flaps 71 which may be pivotally or bendably adjustable, and the horizontal part of the tail plane 57, 57a is also provided with adjustable trailing flaps 72, while the extremity of the vertical fin 53 carries an adjustable vertical trailing flap 73. By a suitable adjustment of the flaps 71, 73 correct yawing trim can be obtained at all speeds and throttle openings, i. e. the aircraft can be made to hold a straight course with the controls neutral. It will be noted that the adjustable flap 73 lies within the slipstream while the adjustable flaps 71 lie outside the slipstream so that by suitable adjustment of the flaps both outside and inside the slipstream the required correction of any tendency to yaw can be obtained, both with engine off and with engine on and with the engine throttled to any given extent. It will be seen that when the aircraft is flown with full engine on at very low forward speed the flap 73 being in the slipstream is effective, but the flaps 71 lying outside the slipstream are substantially ineffective and therefore the flap 73 should be adjusted to suit this condition and the flaps 71 adjusted to suit the maximum speed and gliding conditions, in which they are most effective.

By adjustment of the flaps 72 on the horizontal part of the tail plane the rolling couple produced by the tail plane may be made counteractive to the airscrew reaction torque to quite an exact degree. It will also be noticed that, since the upturned tips 56 are oblique, an adjustment of the flaps 71 will alter the rolling couple of the tail plane and this may be compensated by an adjustment of the flaps 72 in the opposite sense.

An actual pivotal means of adjusting flaps 71, 72, 73 is not illustrated in the drawings since this adjustment may be carried out by simply making said flaps of bendable strips, or in any other convenient manner, as for instance by providing each flap with a small plate quadrant with a series of holes which are selectively engageable with a locking pin carried on the fixed member adjacent the flap.

By way of summarizing the general operation of the craft and some of the broader aspects of the present invention, I might here emphasize a few of the important characteristics thereof. In a craft of this general character, where both the sustension and the control are primarily lodged in the autorotative rotor, a shift of the lift line of the rotor for control purposes operates in conjunction with the "weathercock" action of the body. When the rotor is tilted longitudinally, toward the position 38a or toward the position 38b, the craft as a whole tends to assume a descending or a climbing attitude, respectively. When the rotor is tilted toward the position 38c or the position 38d, a lateral component is introduced, and the body together with its tail surfacing, cooperates therewith to effect a corresponding banking and directional turning action.

With a rudderless machine, as here illustrated, and where ailerons and elevators are also eliminated, it will be seen that the various fin surfacings of the present invention have an important cooperative effect with the rotor, for control purposes. Furthermore, the specific positioning of the surfaces, as described and claimed, as a part of the empennage or tail structure, results in most of the surfacing serving the dual functioning of aiding in the control and effecting the stabilization of the craft in pitch, yaw, and roll; and in this way, a minimum number and area of surfaces is arranged to produce the maximum effects, while minimizing head resistance, skin friction, and parasite drag.

In addition, by making one or more of such normally fixed surfaces (particularly when located at the tail) to serve as an automatic, and automatically variable, aerodynamic counteractant of the airscrew reaction torque, I have substantially overcome one of the really difficult problems in this type of craft; in which, owing to the absence of the large fixed wings, and owing to the hinging of the rotary wings, both the stabilizing and control, in roll, including the counteracting of said torque of the propulsion means, has been a unique problem. Furthermore, it will now readily be seen that where all or most of the control is effected by operating upon the rotor, if counteraction of the torque of the propulsion means must also be taken care of by the rotor control, an excessive range of rotor movement would be (and prior to this invention, was) required, especially because this type of aircraft is capable of substantially vertical descent and very steep climb at low forward speed, under which conditions, upon sudden throttle opening the undesirable reaction torque effects would be very marked. For physical clearances, as well as for other reasons, it is desirable that the range of rotor control movements be relatively limited, and by the present invention that is made feasible.

I claim:—

1. In an aircraft having a powered means of forward propulsion and a normally air-driven autorotative-winged rotor as the primary means of sustension, controlling mechanism operatively connected with the rotor to vary the position of the lift line thereof relative to the aircraft for purposes of lateral control, and normally fixed surfacing positioned within the slipstream of said propulsion means at an aerodynamic incidence relative thereto to effect an automatic couple opposite to the reaction torque of the propulsion means, the positioning and effective area of said surfacing within the slipstream being such as to render said couple of a magnitude approximating the magnitude of the reaction torque, whereby the burden of correcting for such torque is substantially removed from the rotor controlling mechanism, together with means automatically acting to substantially eliminate yawing of the craft throughout the range of slipstream conditions.

2. In a rotative-winged aircraft having an airscrew for forward propulsion, means for lateral control, i. e., control in roll, operating on the rotor as by tilting the rotative wings to produce a lateral tilting of the path swept by the tips of said wings, and normally fixed aerofoil surfacing situated within the slipstream of the airscrew and so disposed angularly to said slipstream that the effective angle of incidence to the slipstream of at least part of such surfacing in a zone radially spaced from the longitudinal axis of symmetry of the aircraft effects an aerodynamic couple substantially neutralizing the airscrew reaction torque, together with means automatically acting to substantially eliminate yawing of the craft throughout the range of slipstream conditions.

3. In a rotative-winged aircraft having an airscrew for forward propulsion, means for lateral control, i. e., control in roll, operating on the rotor as by tilting the rotative wings to produce a lateral tilting of the path swept by the tips of said wings, and normally fixed aerofoil surfaces situated within the slipstream of the airscrew and located at different sides of the longitudinal axis of symmetry of the aircraft, one of said surfaces furthermore being positioned at an effective angle of incidence to said slipstream which differs from such effective angle of incidence of another of said surfaces, so that an aerodynamic couple is produced which substantially neutralizes the airscrew reaction torque, together with means automatically acting to substantially eliminate yawing of the craft throughout the range of slipstream conditions.

4. In an aircraft having a powered means of forward propulsion and a normally air-driven autorotative-winged rotor as the primary means of sustension, controlling mechanism operatively connected with the rotor to vary the position of the lift line thereof relative to the aircraft for purposes of lateral control, and normally fixed surfacing positioned within the slipstream of said propulsion means at such an aerodynamic incidence relative thereto as to effect an automatically-varying couple opposite to the reaction torque of the propulsion means, together with means automatically acting to substantially eliminate yawing of the craft throughout the range of slipstream conditions.

5. An aircraft in accordance with claim 1, characterized by the fact that the said normally fixed surfacing is arranged as or as a part of the tail surfacing of the aircraft, whereby it is positioned also to stabilize the craft in another plane while minimizing parasite drag.

6. An aircraft in accordance with claim 2, wherein the said surfacing is arranged as or as a part of the tail surfacing of the aircraft, whereby it is positioned also to stabilize the craft in another plane while minimizing parasite drag.

7. An aircraft in accordance with claim 3, wherein the said normally fixed surfaces are arranged as or as a part of the tail surfacing of the aircraft, whereby they are positioned also to stabilize the craft in another plane while minimizing parasite drag.

8. An aircraft in accordance with claim 4, wherein the said surfacing is arranged as or as a part of the tail surfacing of the aircraft, whereby it is positioned also to stabilize the craft in another plane while minimizing parasite drag.

9. In an aircraft having means of forward propulsion, a normally air-driven auto-rotative-winged rotor constituting the primary means of sustension for the craft, means for moving the auto-rotative wings for control purposes, normally fixed surfacing positioned within the slipstream of said propulsion means at such an effective incidence angle as to produce an automatic aerodynamic couple in a sense tending to neutralize the reaction torque of the propulsion means, adjustable stabilizing finning located outside the effective zone of the slipstream, and means for varying the effective incidence of at least part of said surfacing.

10. In an aircraft having means of forward propulsion, a normally air-driven autorotative-winged rotor constituting the primary means of sustension for the craft and which effects a downwash distorting or deflecting the axis of the slipstream of the forward propulsion means, means for moving the autorotative wings for control purposes and a pair of normally fixed aerofoils approximately symmetrically disposed about the axis of the slipstream from said propulsion means and having differential effective incidence settings, whereby an aerodynamic couple is produced substantially neutralizing the reaction torque of the propulsion means.

11. In an aircraft having means of forward propulsion, a normally air-driven autorotative-winged rotor constituting the primary means of sustension for the craft, means for moving the autorotative wings for control purposes, normally fixed surfacing positioned within the slipstream of said propulsion means at such an effective incidence angle as to produce an automatic aerodynamic couple in a sense tending to neutralize the reaction torque of the propulsion means, adjustable stabilizing finning located outside the effective zone of the slipstream, and a pilot's control connected with at least a part of said surfacing for varying the position thereof.

12. In an aircraft having means of forward propulsion, a normally air-driven autorotative-winged rotor constituting the primary means of sustension for the craft, means for moving the autorotative wings for control purposes and a substantially horizontally positioned stabilizing tail plane so located as to cooperate with the rotor in the control of the craft and having two portions set at differential incidence for torque compensation.

13. In an aircraft having means of forward propulsion including a propeller, a normally air-driven autorotative-winged rotor constituting the primary means of sustension for the craft, means for moving the autorotative wings for control purposes and a substantially horizontally positioned stabilizing tail plane located well below the line of the propeller axis and having two portions set at differential incidence, said two portions being of substantially similar unsymmetrical aerofoil section, the section of one being reversed with respect to the section of the other.

14. In an aircraft having means of forward propulsion, a normally air-driven autorotative-winged rotor constituting the primary means of sustension for the craft, means for moving the autorotative wings for control purposes and a substantially horizontally positioned stabilizing tail plane having two portions set at differential incidence, said two portions being of substantially similar unsymmetrical aerofoil section, the section of one being reversed with respect to the section of the other, and a pair of tail plane supporting members extending through both said portions and constituting supports common to them both, one of said members being positioned to serve as a pivot and the other member being vertically movable to adjust the average incidence of the entire tail plane.

15. In an aircraft having means of forward propulsion, a normally air-driven autorotative-winged rotor constituting the primary means of sustension for the craft, means for moving the autorotative wings for control purposes and stabilizing surfacing for the craft including a pair of generally upstanding finned surfaces symmetrically disposed, one on each side of the vertical plane of symmetry of the aircraft, and positioned in general planes approximately tangential to the swirling propulsion slipstream near the periphery thereof.

16. In an aircraft having means of forward propulsion, a normally air-driven autorotative-winged rotor constituting the primary means of sustension for the craft, means for moving the autorotative wings for control purposes, and stabilizing tail surfacing forming a part of the aircraft, a portion of the craft being within the effective zone of the slipstream of the propulsion means and a portion being outside thereof, and the aircraft further being characterized by the fact that that part of the aircraft which lies within the slipstream of the propulsion means is positively stable in yaw independently of the rest of the aircraft.

17. In an aircraft having means of forward propulsion, a normally air-driven autorotative-winged rotor constituting the primary means of sustension for the craft, and a substantially horizontal stabilizing tail plane having obliquely upturned tip portions normally fixed in position to set up automatic lateral and directional stabilizing effects.

18. In an aircraft having means of forward propulsion, a normally air-driven autorotative-winged rotor constituting the primary means of sustension for the craft, and a substantially horizontal stabilizing tail plane having obliquely upturned tip portions normally fixed in position to set up automatic lateral and directional stabilizing effects and means for adjusting at least a portion of the upturned tip surfacing for trimming the craft in yaw.

19. In an aircraft having means of forward propulsion, a normally air-driven autorotative-winged rotor constituting the primary means of sustension for the craft, and a substantially horizontal stabilizing tail plane having obliquely upturned tip portions positioned to set up automatic lateral and directional stabilizing effects and means for adjusting at least a portion of the upturned tip surfacing for trimming the craft in yaw comprising an adjustable trailing flap on at least one of said upturned tips, whereby the aircraft holds to a straight course when the controls are neutral.

20. A rudderless aircraft having the elements of claim 18 and further having a substantially vertical tail fin with means for fixedly adjusting its effective incidence or camber, the last mentioned means being within the slipstream, and the means for adjusting at least a portion of the upturned tip surfacing being normally positioned outside of the slipstream, whereby a straight course with neutral controls of the craft can be obtained at all speeds of flight by a suitable combination of adjustments of said adjustable means.

21. An aircraft in accordance with claim 18, and further having adjustable trailing flaps on the horizontal part of the tail plane whereby an adjustable rolling couple may be effected by the tail plane to neutralize the reaction torque of the propulsion means and to compensate for rolling couples set up by varying the adjustment of the upturned tip surfacing.

22. An aircraft having means of forward propulsion, a sustaining rotor with wings positioned for autorotation about an upright axis as the major means of sustension, means for moving the rotary wings to effect a bodily shifting of their path of rotation, as the major means for controlling the craft as to attitude, direction and banking, and normally fixed tail surfacing constituting the major means of stabilizing the craft in pitch, yaw and roll, and including surfacing located within the slipstream of said propulsion means at an effective incidence angle relative thereto adapted to effect automatic counteraction of the reaction torque of said propulsion means.

23. In an aircraft having means of forward propulsion, a normally air-driven autorotative-winged rotor constituting the primary means of sustension for the craft, means for moving the autorotative wings for control purposes, and stabilizing tail surfacing forming a part of the aircraft, a portion of the craft being within the effective zone of the slipstream of the propulsion means and a portion being outside thereof, and the aircraft further being characterized by the fact that that part of the aircraft which lies within the slipstream of the propulsion means is positively stable in yaw independently of the rest of the aircraft, and means acting aerodynamically to counteract the reactive torque of the propulsion means.

24. In an aircraft having means of forward propulsion, a normally air-driven autorotative-winged rotor constituting the primary means of sustension for the craft, means for moving the autorotative wings for control purposes, and stabilizing tail surfacing forming a part of the aircraft, a portion of the craft being within the effective zone of the slipstream of the propulsion means and a portion being outside thereof, and the aircraft further being characterized by the fact that that part of the aircraft which lies within the slipstream of the propulsion means is positively stable in yaw independently of the rest of the aircraft, and means acting aerodynamically to counteract the reactive torque of the propulsion means comprising finning positioned within the effective slipstream thereof.

25. In an aircraft having means of forward propulsion, a normally air-driven autorotative-winged rotor constituting the primary means of sustension for the craft, means for moving the autorotative wings for control purposes and a substantially horizontally positioned stabilizing tail plane so located as to cooperate with the rotor in the control of the craft and having two portions set at differential incidence for torque compensation, said tail plane being positioned below the propeller axis line.

26. In an aircraft, an autorotatable sustaining rotor, propulsion mechanism, means for shifting the lift-line of the rotor with reference to the center of gravity of the craft, a stabilizing surface set to counteract the torque reaction of the propulsion mechanism and positioned to co-act with shifting of the rotor lift-line in controlling the craft, and a steerable tail-wheel and differentially-operative front-wheel brakes with a common control therefor, whereby maximum control and maneuverability of the craft both in the air and on the ground are secured.

JUAN DE LA CIERVA.